United States Patent
Weidner et al.

(10) Patent No.: US 10,025,164 B2
(45) Date of Patent: Jul. 17, 2018

(54) BAYONET FORCE BOOSTER FOR ADD-ON LENS

(71) Applicant: Fluke Corporation, Everett, WA (US)

(72) Inventors: William Weidner, Dublin, NH (US); Peter Alan Driscoll, Troy, NH (US); David Alan Smart, West Chesterfield, NH (US)

(73) Assignee: Fluke Corporation, Everett, WA (US)

( * ) Notice: Subject to any disclaimer, the term of this patent is extended or adjusted under 35 U.S.C. 154(b) by 381 days.

(21) Appl. No.: 14/687,627

(22) Filed: Apr. 15, 2015

(65) Prior Publication Data

US 2016/0306262 A1    Oct. 20, 2016

(51) Int. Cl.
*G03B 17/12*    (2006.01)
*G03B 17/56*    (2006.01)

(52) U.S. Cl.
CPC ............ *G03B 17/12* (2013.01); *G03B 17/565* (2013.01)

(58) Field of Classification Search
CPC ........ G03B 17/12; G03B 17/14; G03B 17/48; G03B 17/565; F16B 5/0092; F16B 5/10; F16B 7/20; F16B 21/04; F16B 21/02; F16B 21/16
See application file for complete search history.

(56) References Cited

U.S. PATENT DOCUMENTS

| | | | | |
|---|---|---|---|---|
| 4,313,626 A | * | 2/1982 | Duncan | F16B 21/04 285/316 |
| 4,359,256 A | * | 11/1982 | Gallusser | F16B 21/04 439/314 |
| 5,416,549 A | * | 5/1995 | Katsuyama | H04N 5/2251 348/E5.025 |
| 2005/0025472 A1 | * | 2/2005 | Sugita | G03B 17/14 396/71 |
| 2005/0237625 A1 | | 10/2005 | Wei | |
| 2007/0127905 A1 | * | 6/2007 | Laganas | G03B 17/561 396/71 |
| 2009/0059400 A1 | * | 3/2009 | Koyama | G02B 7/10 359/825 |
| 2009/0143099 A1 | | 6/2009 | Kang | |

(Continued)

FOREIGN PATENT DOCUMENTS

EP    344806 A2    6/1989
EP    2608528 A1    6/2013

OTHER PUBLICATIONS

Extended European Search Report for Application No. 16165240.9-1568, dated Aug. 11, 2016, 9 pages.

*Primary Examiner* — Christopher M Koehler
(74) *Attorney, Agent, or Firm* — Fredrikson & Byron, P.A.

(57) ABSTRACT

An add-on lens assembly supporting an add-on lens for a camera includes a locking mechanism actuatable by the user in order to increase the attachment force between the lens and the camera. The add-on lens assembly may include a rotatable lock ring having a cam pin that navigates along a surface of a cam such that when the lock ring is rotated, the cam pin causes the cam to translate axially. Axial translation of the cam may compress a spring within the assembly and increase the attachment force between the lens assembly and the camera. The increased force between the add-on lens assembly and the camera may provide additional support for large or heavy assemblies.

15 Claims, 11 Drawing Sheets

(56) References Cited

U.S. PATENT DOCUMENTS

| | | | |
|---|---|---|---|
| 2012/0227257 A1* | 9/2012 | Kalavitz | F16B 21/04 |
| | | | 29/825 |
| 2013/0050453 A1 | 2/2013 | Bergstrom et al. | |
| 2014/0092486 A1* | 4/2014 | Asayama | G02B 7/04 |
| | | | 359/700 |
| 2015/0009585 A1* | 1/2015 | Ho | G02B 7/14 |
| | | | 359/827 |
| 2015/0016814 A1* | 1/2015 | Kuroiwa | G02B 7/14 |
| | | | 396/530 |
| 2015/0077626 A1 | 3/2015 | Lique | |
| 2015/0304636 A1 | 10/2015 | Rhead et al. | |
| 2015/0331221 A1* | 11/2015 | Koiwai | G02B 7/10 |
| | | | 359/701 |

\* cited by examiner

BAYONET FORCE BOOSTER FOR ADD-ON LENS

TECHNICAL FIELD

This disclosure relates to systems and methods for attaching add-on lens assemblies to cameras or other imaging systems.

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can use infrared (IR) energy detection to detect equipment hot spots such as overheating machinery or electrical components, helping to ensure timely repair or replacement of the overheating equipment before a more significant problem develops.

Depending on the configuration of the camera, the thermal imaging camera may also generate a visible light image of the same object. The camera may display the infrared image and the visible light image in a coordinated manner, for example, to help an operator interpret the thermal image generated by the thermal imaging camera. Unlike visible light images which generally provide good contrast between different objects, it is often difficult to recognize and distinguish different features in a thermal image as compared to the real-world scene. For this reason, an operator may rely on a visible light image to help interpret and focus the thermal image.

In some embodiments, an add-on lens is used with the thermal imaging camera to adjust the field of view acquired infrared or visible light images. Add-on lenses can be attached in a variety of ways, such as via a bayonet mounting mechanism. When a bayonet mechanism is used to attach an add-on lens assembly that is used to change the focal length of a lens system, alignment is very important, either to maintain performance and/or boresight requirements. Typical bayonets used on an infrared camera are limited in how large the lens can be. This is because the bayonet mechanism has a spring that provides an axial force to assure the add-on lens is aligned with the base unit. If the spring force is too high, it becomes difficult to attach the lens. Therefore, it is a compromise between how large a lens can be, and how difficult it is to attach a lens. Typical solutions for larger lenses are to provide an external support, which has to be carried separately and installed when it is time to use the lens. This invention eliminates the need for this support, by increasing the axial force on the bayonet with a cam operated mechanism.

SUMMARY

Aspects of the disclosure are directed toward systems and methods for increasing the support of an add-on lens assembly for a camera while maintaining ease of attachment for a user. Some embodiments of an add-on lens assembly include a lens housing and a lens mounted in the lens housing defining an optical axis. The assembly can include a mounting mechanism coupled to the housing and configured to engage an attachment assembly of a camera. The assembly can include a cam positioned adjacent to a portion of the lens housing including a cam slot, and a cam pin extending through the cam slot. The assembly can include a lock ring supporting the cam pin and rotatable between a first lock ring position and a second lock ring position. Rotating the lock ring from the first lock ring position to the second lock ring position may cause the cam pin to navigate through the cam slot, forcing the cam to transition from a first cam position to a second cam position. Movement of the cam between the first and second cam positions may effectively increase the force between a portion of the assembly and the attachment assembly of the camera from a first force to a second force.

In some embodiments, the motion of the cam, and therefore in some examples, the motion of the cam pin and lock ring, is resisted by one or more springs. In some embodiments, the cam slot includes a first end and a second end wherein the cam pin navigates from the first end of the cam slot to the second end as the lock ring is moved from the first lock ring position to the second. At least one of the first and second ends of the cam slot may include a detent to provide a locking feel when the cam pin enters the detent.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g. blurring, ghosting, etc.), an image alignment process is performed on the thermal images prior to averaging.

Figure 1:
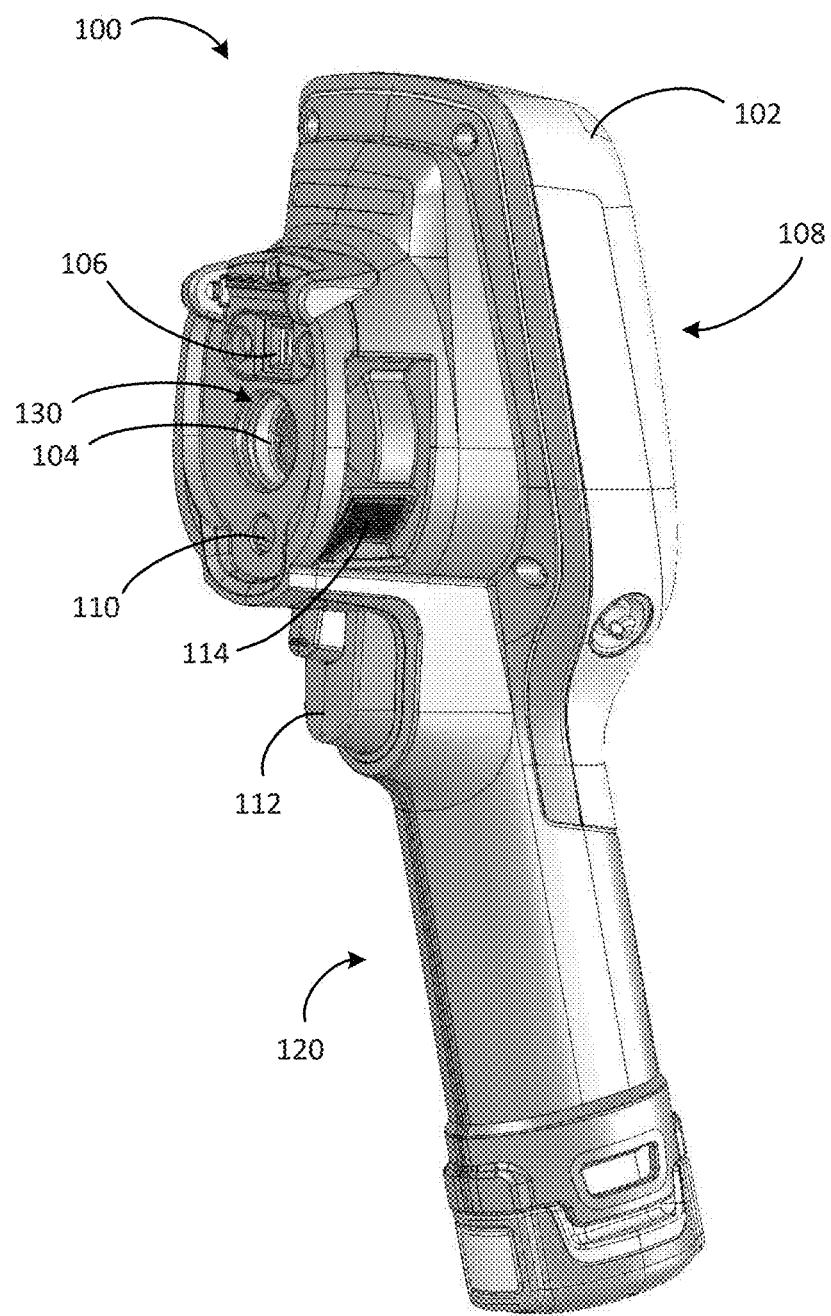
FIG. 1 is a perspective front view of an example thermal imaging camera.
Figure 2:
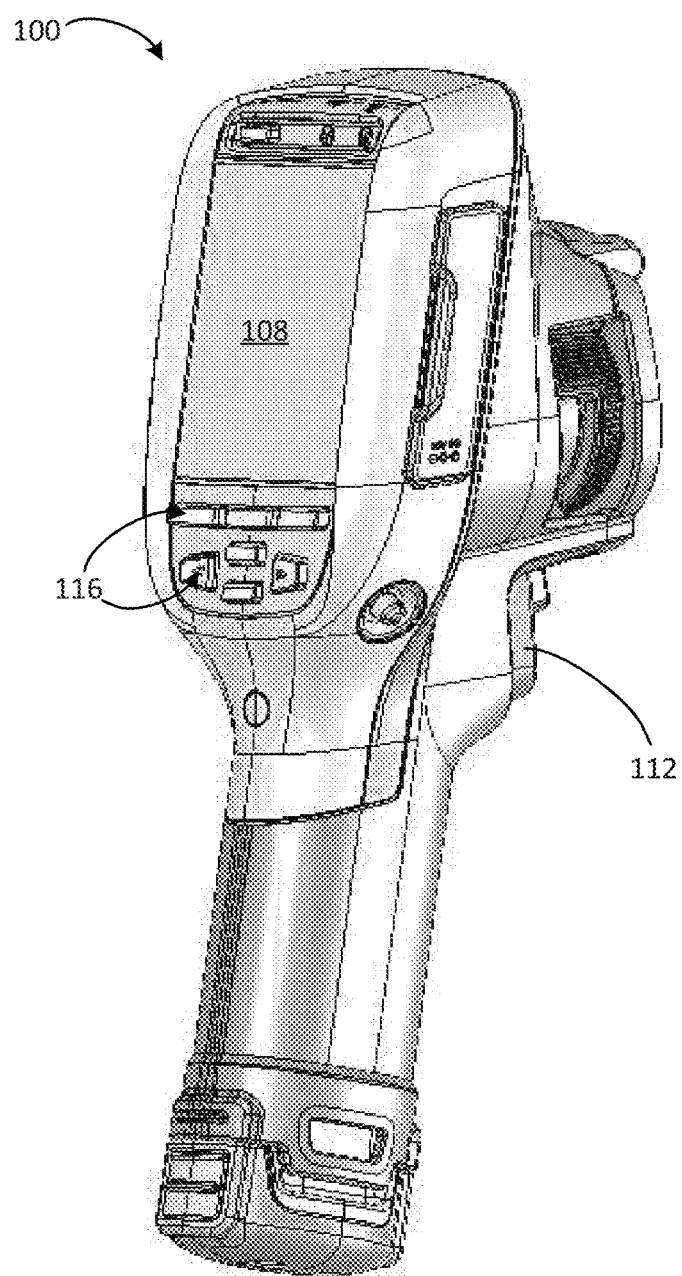
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114, or may, in other embodiments, simply maintain a fixed focus.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

Data of the distance-to-target, as measured by the laser 110, can be stored and associated with the corresponding captured image. For images which are captured using automatic focus, this data will be gathered as part of the focusing process. In some embodiments, the thermal imaging camera will also detect and save the distance-to-target data when an image is captured. This data may be obtained by the thermal imaging camera when the image is captured by using the laser 110 or, alternatively, by detecting the lens position and correlating the lens position to a known distance-to-target associated with that lens position. The distance-to-target data may be used by the thermal imaging camera 100 to direct the user to position the camera at the same distance from the target, such as by directing a user to move closer or further from the target based on laser measurements taken as the user repositions the camera, until the same distance-to-target is achieved as in an earlier image. The thermal imaging camera may further automatically set the lenses to the same positions as used in the earlier image, or may direct the user to reposition the lenses until the original lens settings are obtained.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that includes a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
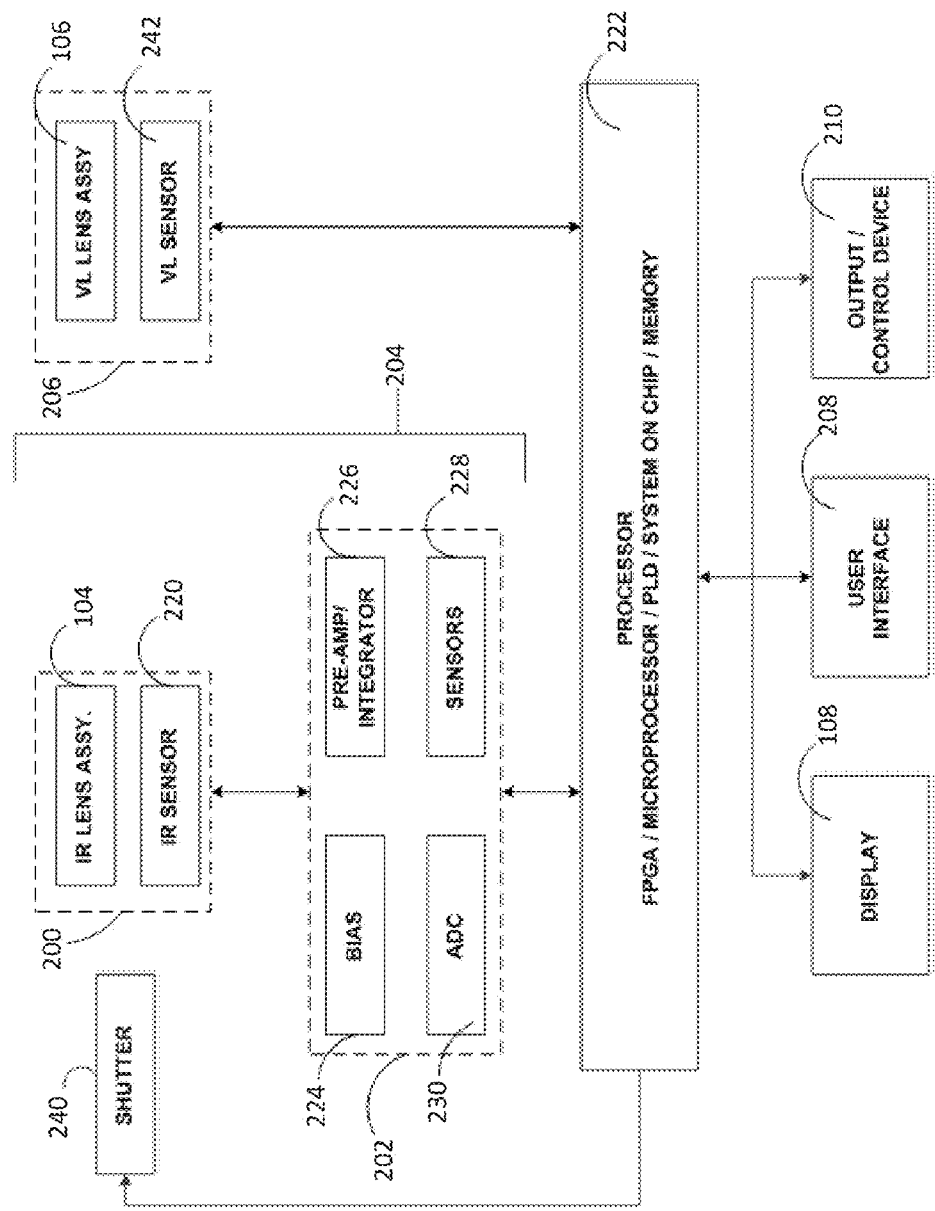
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108. A more detailed discussion of components of FIG. 3 may be found in U.S. Patent Application No. 61/982,665, entitled "Methods for end-user parallax adjustment," which was filed on Apr. 22, 2014, and is hereby incorporated by reference in its entirety.

The IR lens assembly 104 shown in FIG. 1 on the thermal imaging camera 100 can comprise a base IR lens assembly that functions to collect IR energy from an object scene and focus the IR energy on the focal plane array contained inside the camera. The thermal imaging camera 100 works with the IR lens alone and can generate thermal images without using any add-on lens hardware. To achieve wider or narrower fields of view, however, the thermal imaging camera 100 is designed to work with a set of one or more add-on IR lenses (not shown in FIG. 1) that can be attached over the base IR lens assembly 104. In use, an operator can select a desired add-on IR lens from a set of available add-on IR lenses and attach the selected add-on IR lens to the thermal imaging camera 100. In some examples, an add-on lens is housed in an add-on lens assembly that is attachable to the camera 100. If desired, the selected add-on IR lens assembly can subsequently be detached from the thermal imaging camera 100 so the camera can either be used with the base IR lens assembly 104 alone or a different add-on IR lens assembly can attached to the camera. Different add-on IR lenses may be used, for example, depending on the size of the object scene, the distance to the target under inspection, or the like.

Figure 4:
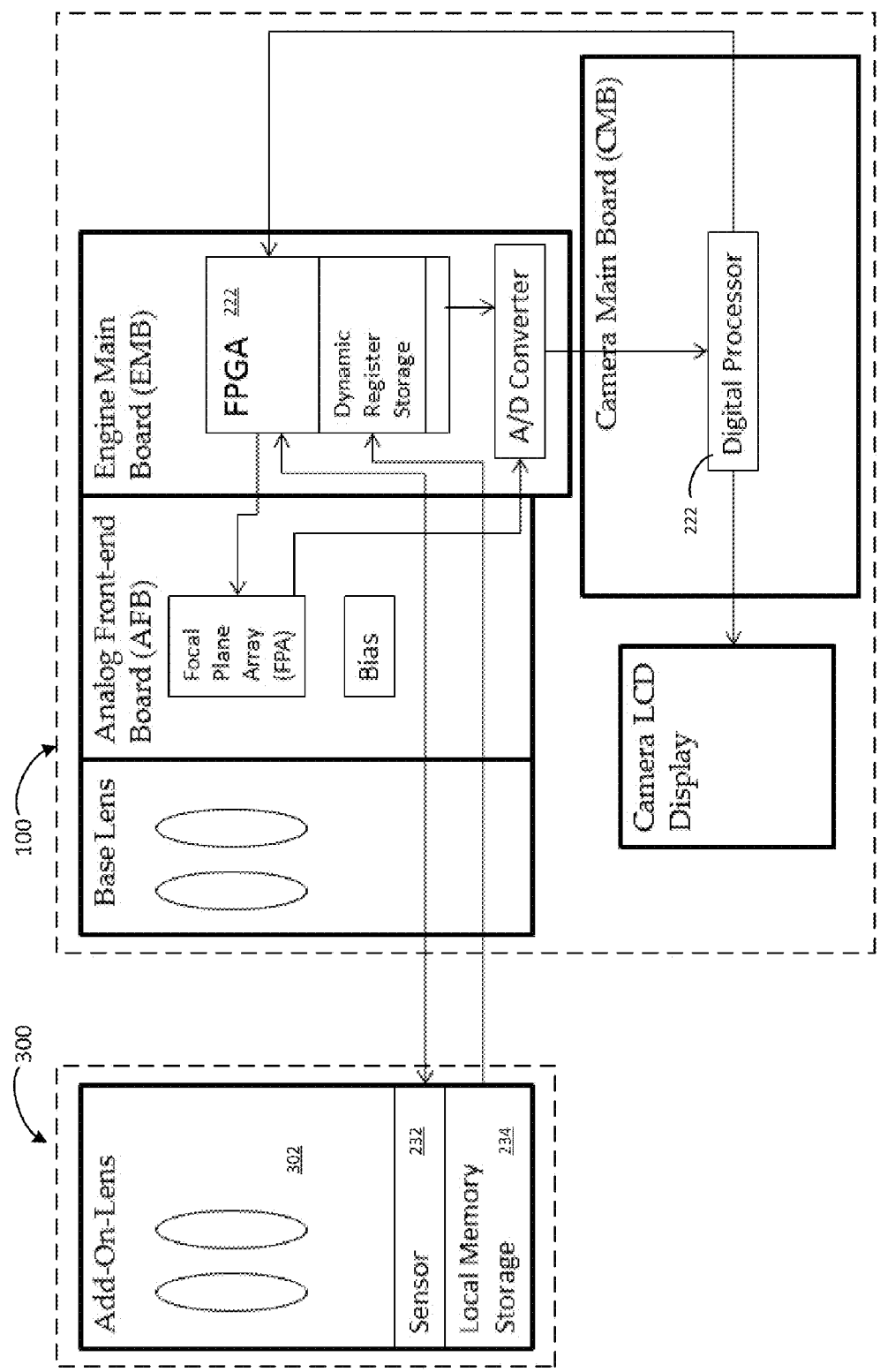
FIG. 4 is a schematic representation showing engagement and communication between portions of the thermal imaging camera and an add-on IR lens assembly.

In some embodiments, an add-on lens assembly may communicate with one or more components of an add-on lens assembly. FIG. 4 is a schematic representation showing engagement and communication between portions of the thermal imaging camera 100 and an add-on IR lens assembly 300, when used. As shown, an add-on IR lens assembly 300 can comprise a local memory storage 334 that stores data unique to the specific add-on IR lens assembly 300 being attached to the thermal imaging camera 100. The add-on IR lens assembly 300 can further include a sensor 332 for detecting operating conditions such as a temperature sensor. In some embodiments, when the add-on IR lens assembly 300 is attached to the thermal imaging camera 100, the sensor 332 and/or local memory storage 334 of the add-on IR lens assembly 300 are placed in communication with the processor/FPGA 222 housed inside of the camera 100. Details of communication between an add-on lens assembly such as add-on IR lens assembly 300 and a camera 100 are described in U.S. Patent Application No. 61/982,665, which is incorporated herein by reference.

Figure 5:
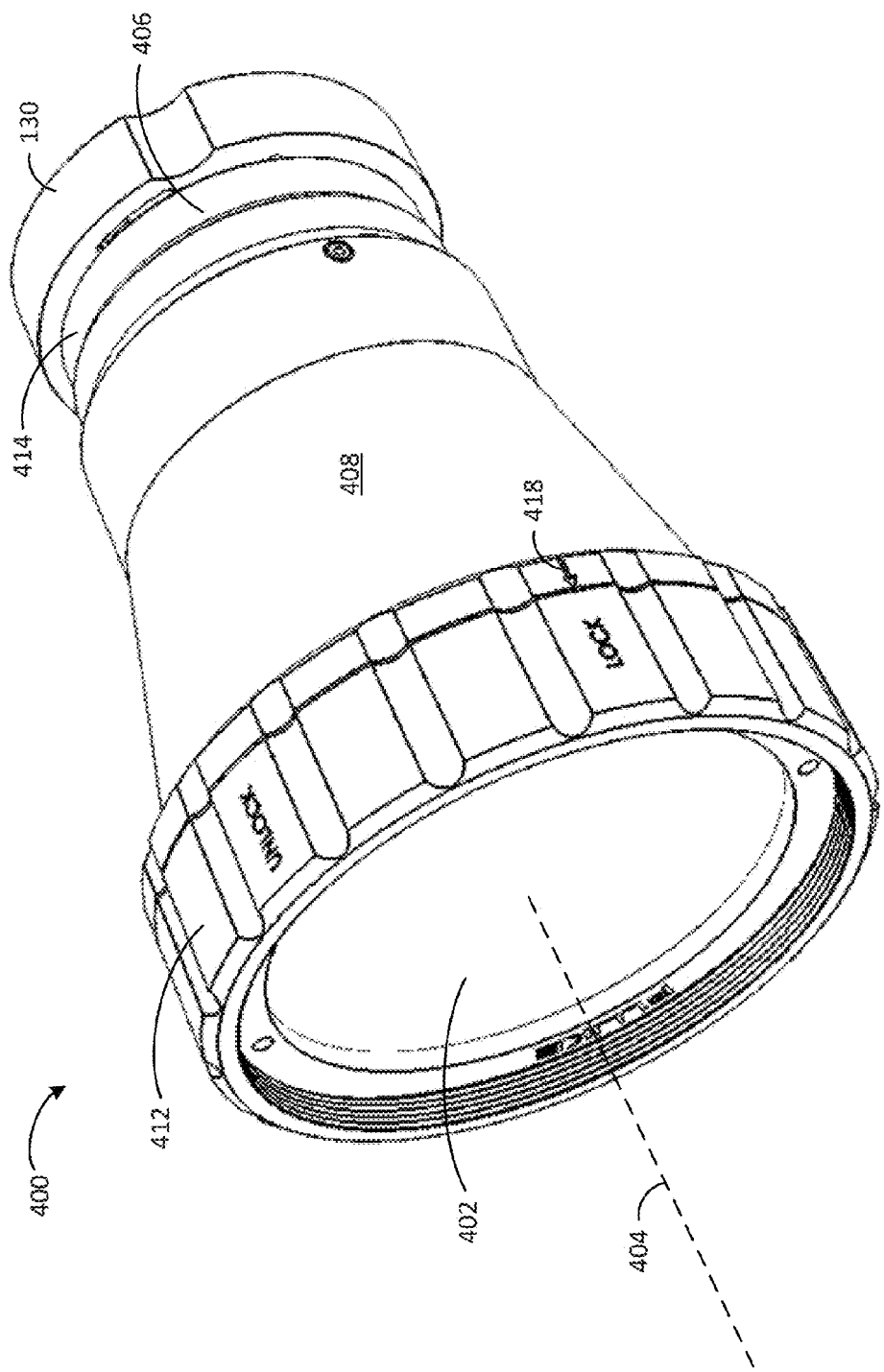
FIG. 5 is a perspective view of an exemplary add-on lens assembly coupled to an attachment assembly of the camera.

As shown in FIG. 1, in some embodiments, the IR lens assembly 104 can include an attachment assembly 130 for receiving a mounting mechanism of an add-on lens assembly. FIG. 5 is a perspective view of an exemplary add-on lens assembly coupled to an attachment assembly of the camera. As shown, the add-on lens assembly 400 includes a lens 402 defining a lens plane and an optical axis 404 normal thereto. The add-on lens assembly 400 further includes a mounting mechanism 406 for attaching to an attachment assembly 130 of a camera (such as camera 100). The lens 402 can be secured to a housing 412 of the add-on lens assembly 400

Add-on lenses can be attached to the camera 100 by a variety of known methods, such as, for instance, a bayonet mount. In the case of a bayonet mount, the attachment assembly may include openings for receiving one or more tabs on the mounting mechanism of the lens. The attachment assembly can include one or more grooves adjacent to the openings into which the tabs of the mounting mechanism can be rotated, preventing the tabs from being removed from the attachment assembly. In many cases, the mounting mechanism and/or attachment assembly includes one or more springs configured to provide an axial force between the one or more groove of the attachment assembly and the one or more tabs of the mounting mechanism. Such springs can act to secure the add-on lens in place against gravity or other external forces experienced by the add-on lens assembly.

However, as described above, a bayonet mount may be limited by the size or weight of an add-on lens. For instance, a lens that is too heavy, or that has a center of mass to far from the camera when attached, may place too large of a load on the attachment assembly, causing the one or more springs to give. This may result in the add-on lens sagging with respect to the camera, misaligning the add-on lens with the IR lens assembly 104. One solution to prevent such sagging can include increasing the spring constant associated with one or more springs on the attachment assembly or the mounting mechanism. However, increased spring tension may result in the add-on lens assembly 400 being more difficult to align and attach to the IR lens assembly 104.

Accordingly, in some examples, the add-on lens assembly 400 can include a locking mechanism, such as a lock ring 408, configured to selectively increase the attachment force between the add-on lens assembly 400 and a camera when actuated. The attachment force may be, for example, a spring force as described above with regard to the bayonet attachment structure. In the exemplary embodiment of FIG. 5, the lock ring 408 may be rotated by a user to increase or decrease the attachment force between the add-on lens assembly 400 and the camera, such as between the add-on lens assembly 400 and attachment assembly 130. The add-on lens assembly 400 can include a pusher 414 proximate the mounting mechanism 406 for engaging a portion of the attachment assembly 130 of the camera. For example, the adjusted attachment force may include a force between the pusher 414 of the add-on lens assembly 400 and the attachment assembly 130 of the camera. In some examples, the lock ring 408 is rotated about the optical axis 404 defined by the lens 402. Additionally or alternatively, the lock ring 408 can be rotated about a portion of the housing 412 of the add-on lens assembly 400.

In some embodiments, the lock ring 408 may be rotatable between a first position and a second position. The lock ring 408 in the first position may correspond to a first attachment force between the add-on lens assembly 400 and the camera, while the second position may correspond to a second attachment force that is larger than the first attachment force. Accordingly, a user may attach the add-on lens assembly 400 to the camera with the lock ring 408 in the first position, and then actuate the lock ring 408 to the second position, increasing the attachment force.

In some examples, actuating the lock ring 408 between a first position and a second position comprises moving the lock ring 408 relative to the housing 412. For example, in the illustrated example, actuating the lock ring 408 can include rotating the lock ring 408 relative to the housing 412. In some embodiments, one or both of the lock ring 408 and the housing 412 (or other fixed component relative to the movement of lock ring 408) can include at least one indicator 418 for visually indicating the current position of the lock ring 408 to the user. As illustrated in the exemplary embodiment of FIG. 5, the lock ring 408 includes an indicator 418 comprising an arrow that points toward a portion of the housing 412. As the lock ring 408 rotates about the housing 412, the indicator 418 moves relative to the housing 412.

In the illustrated embodiment, the indicator 418 may move between portions of the housing 412 labeled "LOCK" and "UNLOCK." In various embodiments, these or other descriptors may be used to communicate to the user information regarding the attachment force between the pusher 414 and the attachment assembly 130. For instance, in the embodiment of FIG. 5, the indicator 418 pointing toward "LOCK" indicates that the attachment force is higher than if the indicator 418 pointed toward the "UNLOCK" state. Accordingly, the user may know that, if the add-on lens assembly 400 is detached from a camera, it may be difficult to attach the assembly 400 without adjusting the add-on lens assembly 400 to be in the "UNLOCK" state.

Figure 6A:
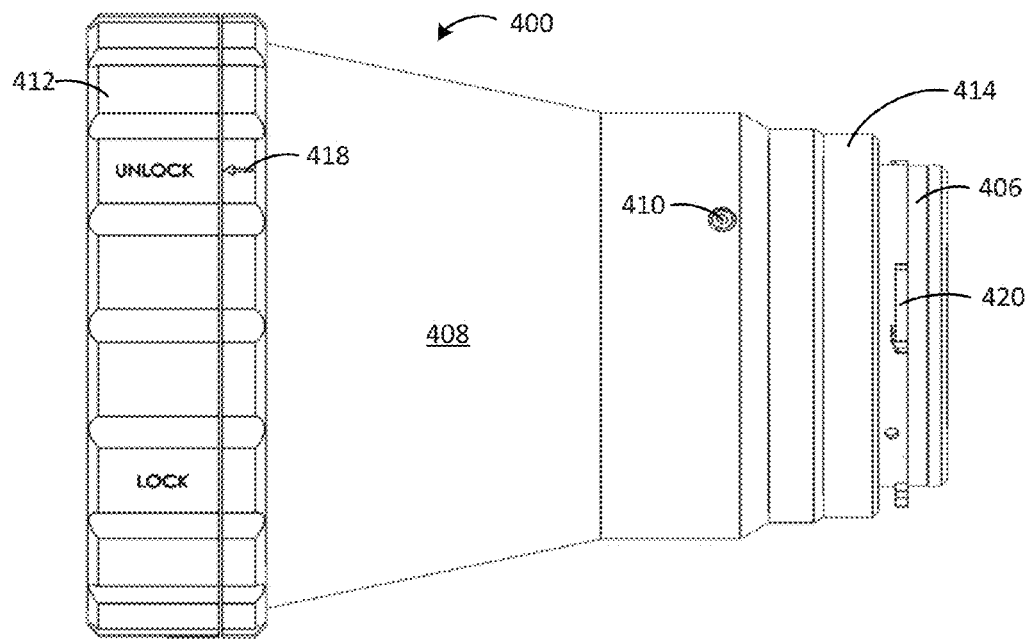
FIGS. 6A and 6B are side views of an add-on lens assembly illustrating exemplary adjustment of a lock ring from a first position to a second position.
Figure 6B:
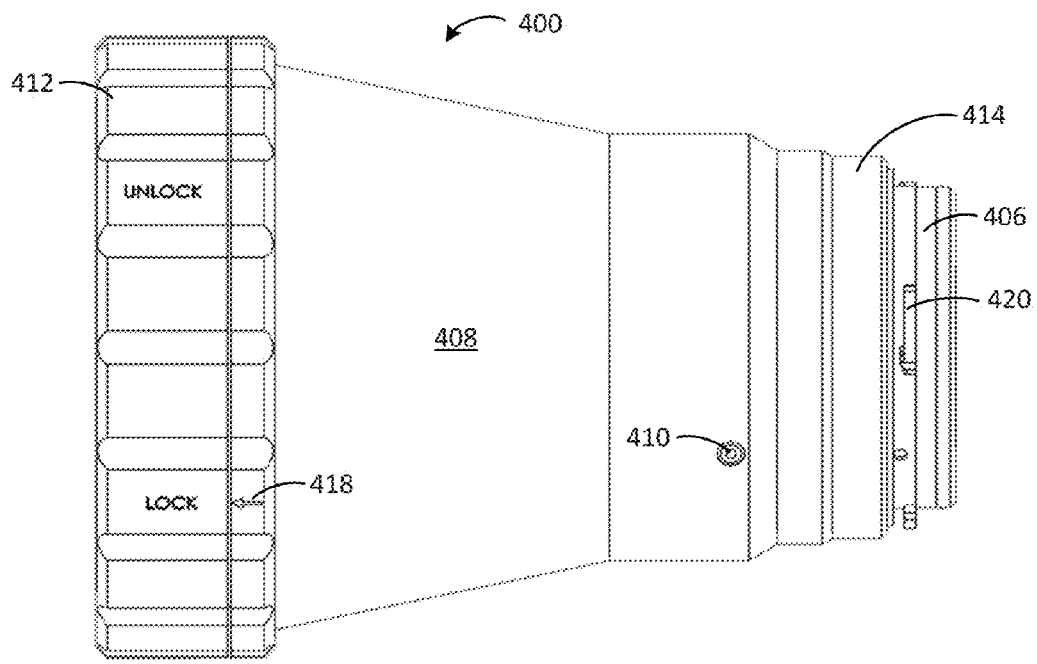

FIGS. 6A and 6B are side views of an add-on lens assembly illustrating exemplary adjustment of a lock ring from a first position to a second position. In the illustrative embodiment of FIGS. 6A and 6B, the add-on lens assembly 400 includes a mounting mechanism 406 including at least one tab 420, for example, for mounting to a bayonet mount of a camera. In the embodiment of FIG. 6A, the lock ring 408 is positioned in a first lock ring position. In the first lock ring position, indicator 418 points toward the "UNLOCK" marker on the housing 412. The add-on lens assembly 400 includes a pin 410 coupled to the lock ring 408, which may be configured to move with the lock ring 408 as it is actuated.

In the embodiment of FIG. 6B, the lock ring 408 has been actuated from the first lock ring positon (e.g., as shown in FIG. 6A) to a second lock ring position. In the second lock ring positon, indicator 418 points toward the "LOCK" marker on the housing 412. Thus, lock ring 408 has been moved relative to the housing 412. As shown, pin 410 has moved with lock ring in moving between the first lock ring position and the second lock ring position. It can be seen by a comparison of FIGS. 6A and 6B that in the illustrated embodiment, the lock ring 408 rotates relative to the housing 412 and also the mounting mechanism 406. That is, in transitioning between the first and second lock ring positions, the indicator 418 and pin 410 move relative to the housing 412 and also the tab 420 of the mounting mechanism 406. Accordingly, when the mounting mechanism 406 is attached to an attachment assembly of a camera, actuating the lock ring 408 between first and second lock ring positions does not affect the position of tab 420.

Figure 7A:
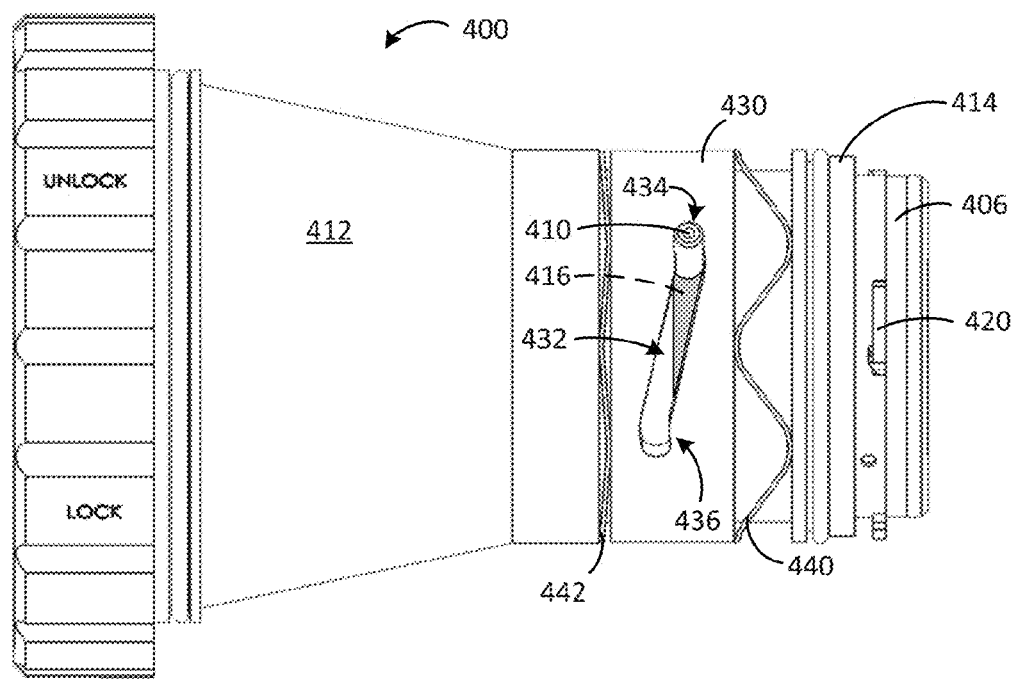
FIGS. 7A-7C are side views of an add-on lens assembly illustrating an exemplary effect of adjusting a lock ring from a first position to a second position when the lock ring is removed.
Figure 7B:
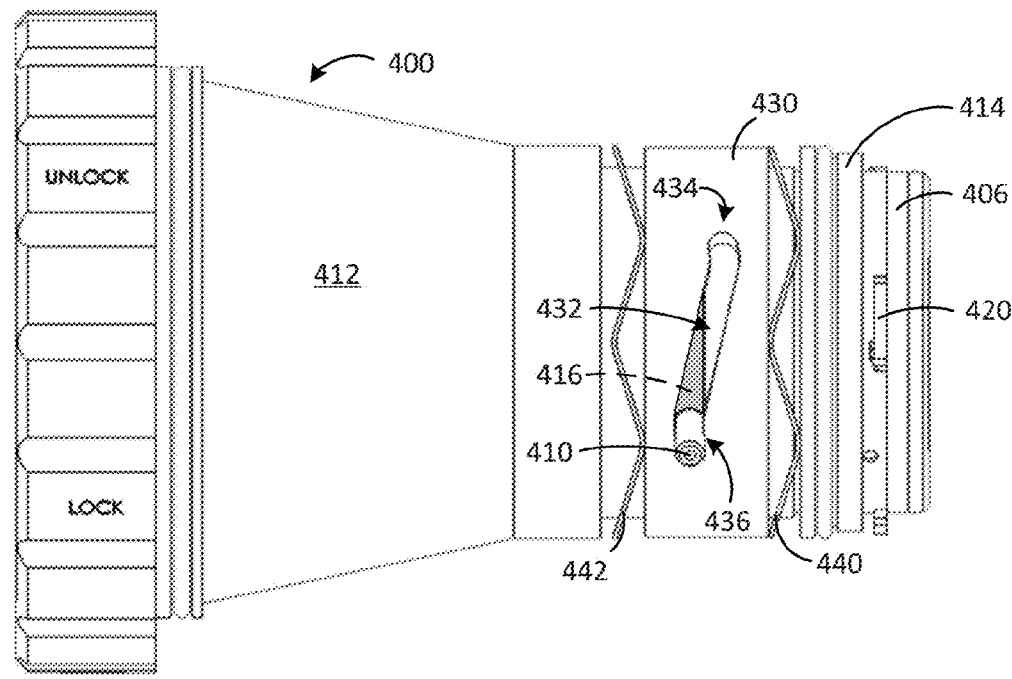

FIGS. 7A and 7B are side views of an add-on lens assembly illustrating an exemplary effect of adjusting a lock ring from a first position to a second position when the lock ring is removed. In the embodiments, add-on lens assembly 400 includes a cam 430 positioned proximate to the housing 412. The cam 430 includes a cam slot 432 having a first end 434 and a second end 436, and a first length extending between the first end 434 and the second end 436. In some embodiments, the first length of the cam slot 432 extends in a direction that is not parallel to the lens plane. Additionally or alternatively, in some examples, the first length of the cam slot 432 extends in a direction that is not normal to the axis of rotation of the lock ring 408.

In the illustrated embodiment, the add-on lens assembly 400 include a first spring 440 positioned between the cam 430 and a proximal portion of the housing 412. The first spring 440 can include one or more wave springs that entirely or partially encircle a portion of the housing 412. In other embodiments, spring 440 can include one or more linear springs or an otherwise elastic material disposed around a portion of the circumference of the housing 412 proximate the cam 430. In some embodiments, the assembly 400 includes a second spring 442 positioned between the cam 430 and a distal portion of the housing 412. Second spring 442 may have properties similar to the first spring 440, or may be a different type of spring. In the illustrated embodiment of FIG. 7A, the cam 430 is in a first cam position, wherein the second spring 442 is compressed and the first spring 440 is uncompressed.

As previously discussed, the add-on lens assembly 400 can include a pin 410 coupled to the lock ring 408. In some embodiments, pin 410 comprises a cam pin 410 having a first end coupled to the lock ring 408 and a free second end that extends through the cam slot 432 of the cam 430. In some embodiments, the housing 412 of the add-on lens assembly 400 includes a radial groove 416 located beneath the cam 430 for receiving the second end of the cam pin 410. Cam slot 432 and radial groove 416 can be sized so that cam pin 410 may navigate through the slot 432 or groove 416.

During operation, as the lock ring 408 rotates about a portion of the housing 412, the cam pin 410 navigates through the first length of the cam slot 432. In some embodiments, the lock ring rotates about the optical axis defined by the lens 402 of the add-on lens assembly 400, and does not substantially translate axially. For instance, in some embodiments, the lock ring 408 is held at a substantially fixed axial position by one or more portions of the housing 412 preventing axial translation of the lock ring 408. Additionally or alternatively, the cam pin 410 extending into the radial groove 416 of the housing 412 may prevent the lock ring 408 from translating axially.

In general, rotation of the lock ring 408 about a portion of the housing 412 causes the cam pin 410 to move about the housing 412 in a direction that is not parallel to the first length of the cam slot 432. This forces the cam 430 to translate axially as the lock ring 408 is rotated. In the illustrated embodiment of FIG. 7A, the cam pin 410 may move from the first end 434 of the cam slot 432, through the first length, to the second end 436 of the cam slot 432.

FIG. 7B is an exemplary diagram illustrating motion of the cam pin 410 through cam slot 432. As shown in FIG. 7B, relative to FIG. 7A, the cam pin 410 has moved from the first end 434 to the second end 436 of the cam slot 432. As a result, cam 430 has translated axially and proximally relative to the housing 412 of the add-on lens assembly 400 (e.g., see FIG. 7C). By moving proximally, the cam 430 has released at least some of the compression on the second spring 442, and has compressed first spring 440.

Figure 7C:
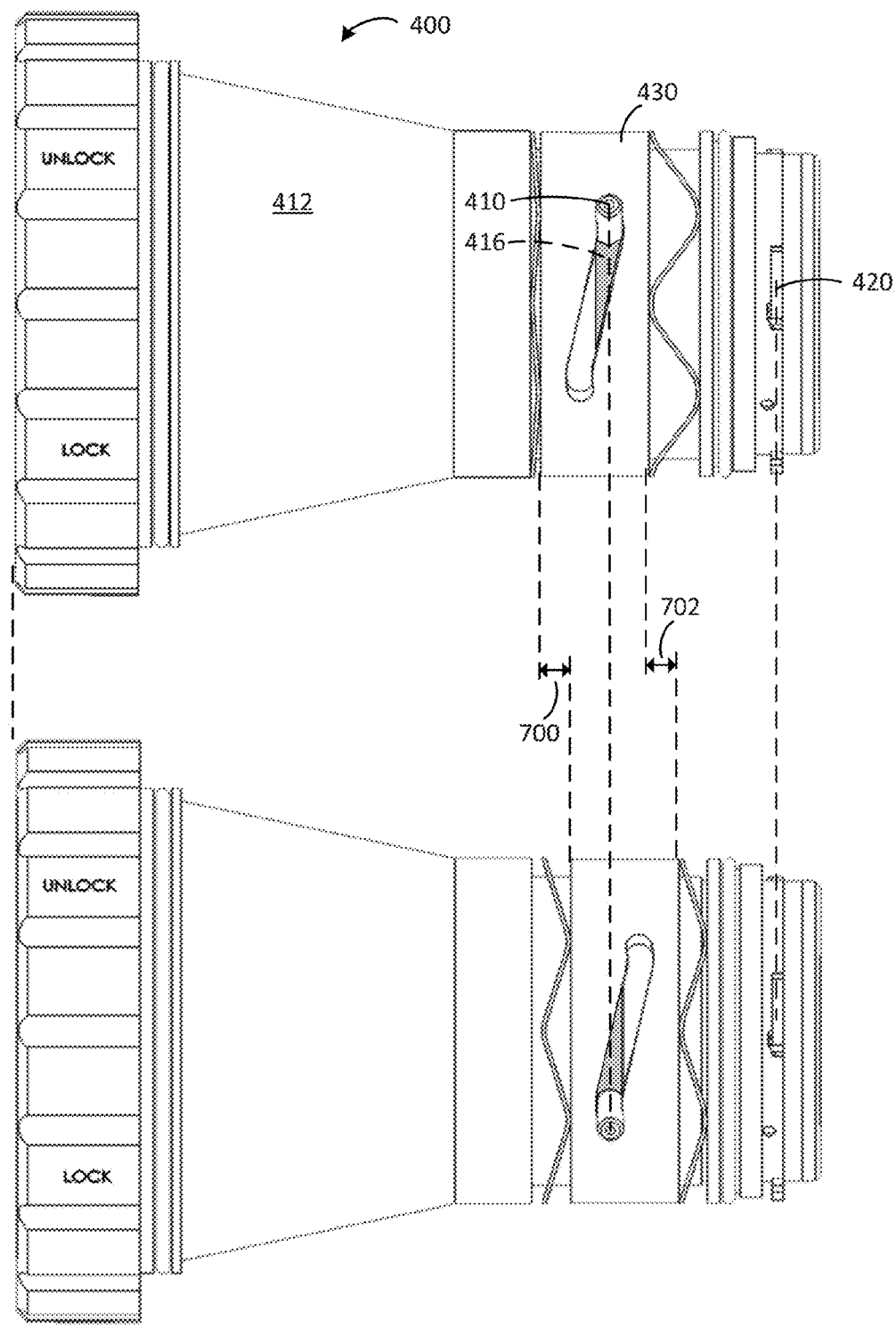

FIG. 7C is a diagram illustrating the embodiments of FIGS. 7A and 7B aligned with one another. As shown by the dashes lines, the distal end of the housing 412, the tabs 420 on the mounting mechanism 406, the cam pin 410, and the radial groove 416 of the housing have not substantially translated axially between the top and bottom diagrams. However, lines 700, 702 illustrate that the cam 430 has translated axially and proximally relative to the rest of the add-on lens assembly 400.

Figure 8A:
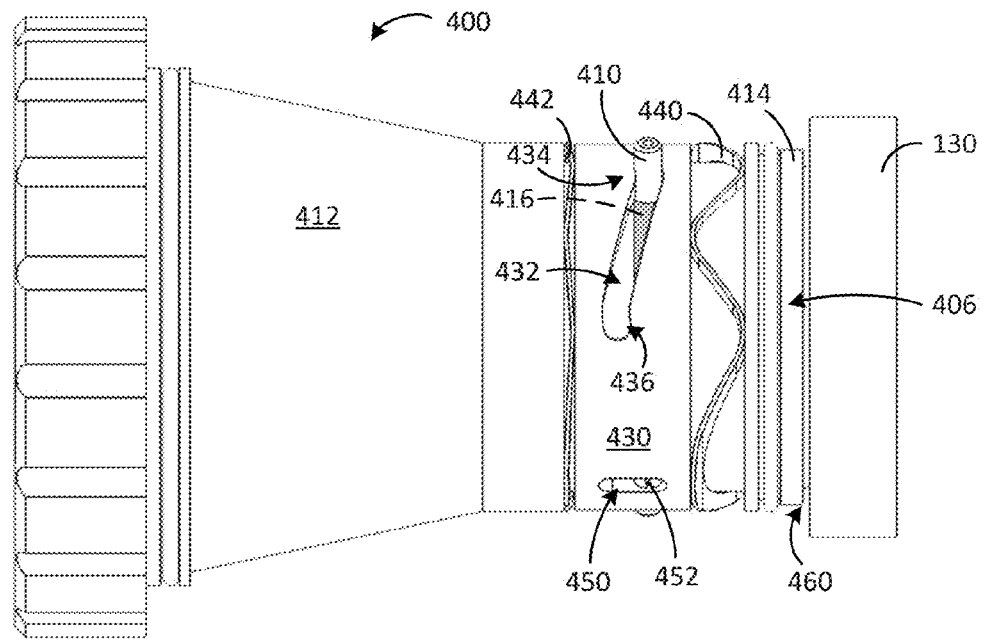
FIGS. 8A and 8B are exemplary diagrams illustrating the attachment of an add-on lens assembly to an attachment assembly of a camera.
Figure 8B:
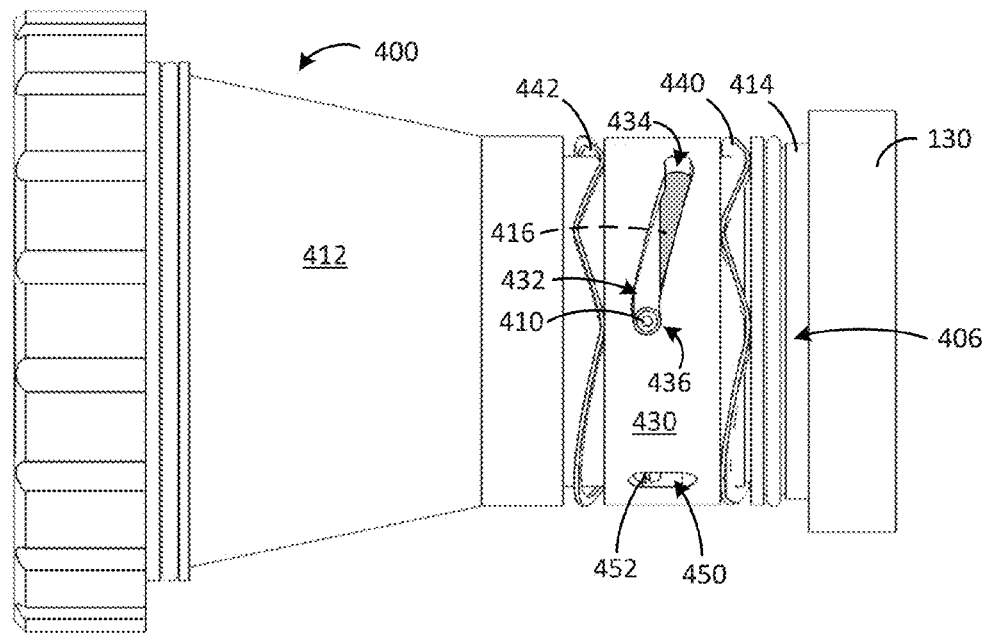

As shown in the exemplary embodiments illustrated in FIGS. 7A-7C, actuating the lock ring 408 can cause the cam 430 to translate within the add-on lens assembly 400, changing the compression experienced in first 440 and second 442 springs. FIGS. 8A and 8B illustrate the effect of such movement and compression when the add-on lens assembly is attached to the attachment assembly of a camera. FIGS. 8A and 8B are exemplary diagrams illustrating the attachment of an add-on lens assembly to an attachment assembly of a camera.

FIG. 8A illustrates a partially-rotated view of the embodiment of FIG. 7A. In the illustrated embodiment, cam pin 410 extends through the first end 434 of cam slot 432 in cam 430. The add-on lens assembly 400 is attached to the attachment assembly 130 of a camera by mounting mechanism 406. In the illustrated embodiment, the pusher 414 of the mounting mechanism 406 is proximate the attachment assembly 130, but there exists gap 460 therebetween. In some embodiments, gap 460 may represent a spatial gap between the pusher 414 and the attachment assembly 130. In alternative embodiments, gap 460 may be representative of a first force between the pusher and the attachment assembly 130 of the camera.

In the illustrated embodiment of FIG. 8A, the cam 430 includes an axial slot 450 receiving an axial pin 452. Axial pin 452 may be secured to a portion of the housing 412 at a first end and extend outward into the axial slot 450 at its second end. In some examples, the axial pin 452 prevents cam 430 from substantially rotating, limiting its motion to substantially axial translation.

FIG. 8B illustrates a partially-rotated view of the embodiment of FIG. 7B. In the illustrated embodiment, the cam pin 410 has navigated from the first end 434 to the second end 436 of cam slot 432 relative to the configuration of FIG. 8A. As described above with regard to FIGS. 7A-7C, such motion of the cam pin 410 causes cam 430 to translate proximally and axially toward the mounting mechanism 406. Proximal cam 430 motion compresses first spring 440 while relieving compression from second spring 442. In the illustrated embodiment, compression of first spring 440 forces pusher 414 of the mounting mechanism 406 against attachment assembly 130 of a camera.

While shown between FIGS. 8A and 8B as eliminating gap 460, forcing pusher 414 against attachment assembly 130 may comprise increasing the force between the components from a first force to a second force, greater than the first. The increased force between the pusher 414 of the mounting mechanism 406 and the attachment assembly 130 can act to increase the supporting capability of the mounting structure. This may allow for a longer, larger, or heavier add-on lens assembly 400 to be secured to the camera with reduced risk of the assembly sagging and reducing alignment between the add-on lens and the lens of the camera. In some exemplary embodiments, the second force is approximately four times larger than the first force.

Increased force between the pusher 414 and the attachment assembly 130 may make it difficult for a user to detach the add-on lens assembly 400 from the camera. Accordingly, when operation using the add-on lens is complete, the user can move the lock ring 408 from the second lock ring position back to the first lock ring position. In doing so, the cam pin 410 navigates from the second end 436 of the cam slot 432 to the first end 434, forcing the cam 430 to move distally. Distal motion of the cam 430 releases pressure from the first spring 440, which can result in a reduced force between the pusher 414 and the attachment assembly 130. Such a process can be represented by transitioning from the configuration of FIG. 8B to the configuration of FIG. 8A.

In some embodiments, distal movement of the cam 430 may be resisted by compression of the second spring 442. Resistance provided by the second spring 442 may provide the user with a similar feeling in rotating the lock ring 408 in either direction. Further, in some examples, one or both of first 434 and second 436 ends of the cam slot 432 can include a detent for receiving the cam pin 410 at the end of the cam slot 432. This can provide for a 'locking' feel for the user when the cam pin 410 enters the detent(s), indicating that the lock ring 408 has fully transitioned to one of the first or second lock ring positions.

Figure 9:
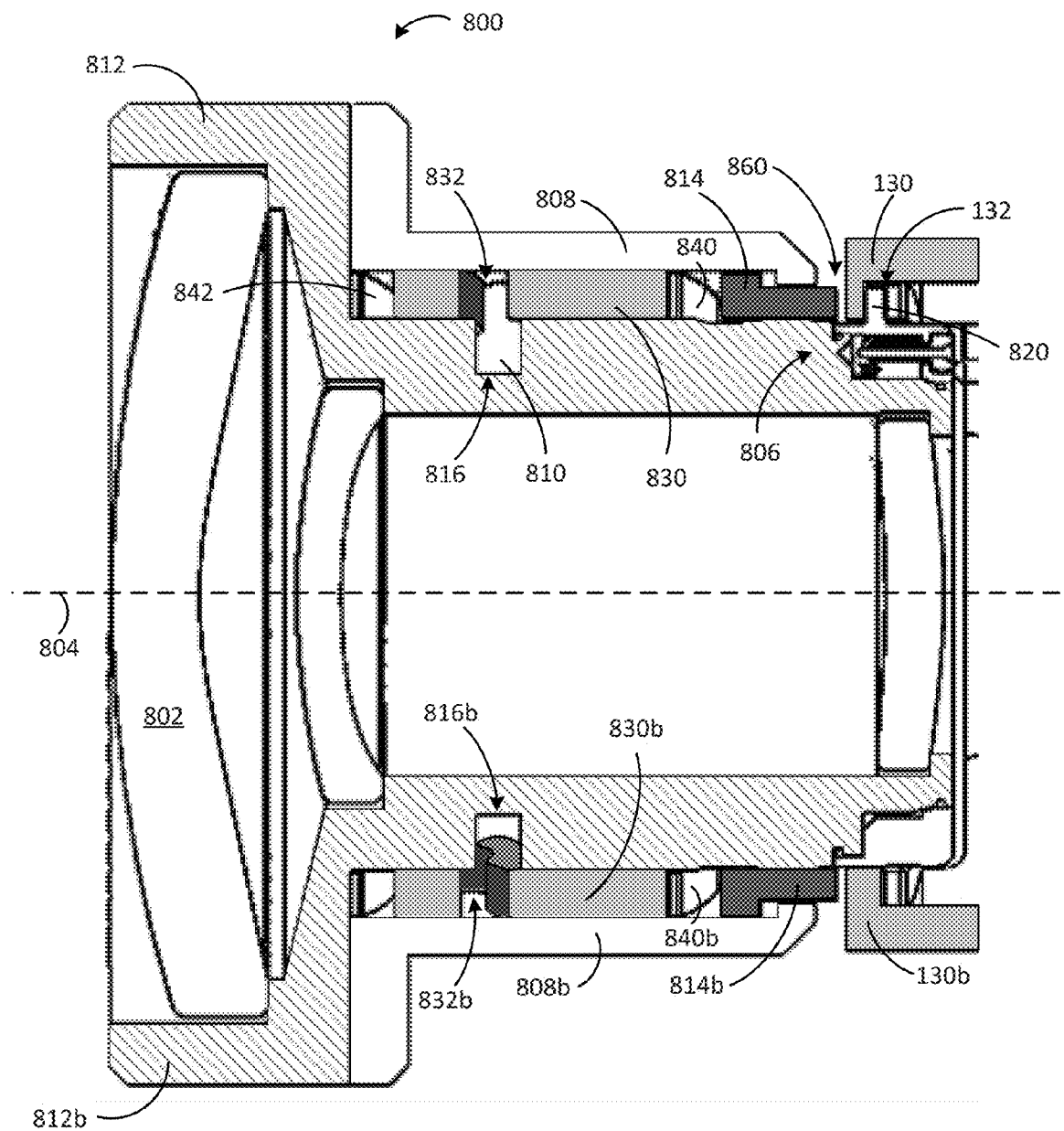
FIG. 9 is a cross-sectional view of an add-on lens assembly according to some embodiments.

FIG. 9 is a cross-sectional view of an add-on lens assembly according to some embodiments. As shown, in the illustrated embodiment, add-on lens assembly 800 includes a lens 802 defining an optical axis 804. Lens 802 is supported by housing 812, shown in a cross-hatch pattern for clarity. The add-on lens assembly 800 includes a mounting mechanism 806, including a tab 820 interfacing with a groove 132 of an attachment assembly 130 of a camera. The assembly 400 includes a pusher 814 proximate the attachment assembly 130. In the illustrative example of FIG. 9, there exists a gap 860 between pusher 814 and attachment assembly 130. As described above, the gap 860 may be a physical gap, or may represent a first force between the pusher 814 and the attachment assembly 130.

In the illustrated embodiment, the add-on lens assembly 800 includes a lock ring 808 supporting a cam pin 810. The cam pin 810 extends inward from the lock ring 808 into a radial groove 816 in the housing 812. The add-on lens assembly 800 includes a cam 830 disposed between the lock ring 808 and a portion of the housing 812. As described with regard to previous embodiments, cam 830 includes a cam slot 832 through which a portion of the cam pin 810 extends. The add-on lens assembly 400 includes a first spring 840 disposed between the cam 830 and the pusher 814, and a second spring 842 between the cam 830 and a portion of the housing 812.

Similarly to the embodiments described above, in the embodiment of FIG. 9, lock ring 808 may be rotated about the optical axis 804, causing cam pin 810 to navigate through the cam slot 832. In some examples, actuating the lock ring 808 from a first lock ring position to a second lock ring position causes the cam pin 810 to move from a first end to a second end of the cam slot 832. The cam pin 810 may move radially through radial groove 816, and force the cam 830 to move proximally toward the pusher 814.

As the cam 830 moves toward pusher 814, it compresses spring 840, which in turn applies addition pressure to pusher 814. The additional pressure on pusher 814 can result in increased force between the pusher 814 and attachment assembly 130 of the camera. As previously described, increased force between the pusher 814 and the attachment assembly 130 may increase the stability of the add-on lens assembly 800 mounted on a camera.

In the illustrated cross-section of the embodiment of FIG. 9, add-on lens assembly 800 includes a variety of counterpart components (labeled 'b') of those described above. For example, assembly 800 includes lock ring 808b, radial groove 816b, pusher 814b proximate attachment assembly 130b, cam 830b having cam slot 832b, and a first spring 840b between the cam 830b and the pusher 814b. While not shown in FIG. 9, assembly can include a second cam pin having a first end fixed to lock ring 808b and a second end positioned to navigate through the second cam slot 832b and radial groove 816b. Such components may operate together in the same way as described above. In some examples, any number of such components can be operatively connected to its counterpart described previously. For example, cam 830 can at least partially encircle housing 812 so that the cam 830 and cam 830b are a single piece. The same can be true for any such components labeled 'b' in FIG. 9, such as lock ring 808, spring 840, pusher 814, and the like.

In some examples, cam 830/830b is a single piece at least partially surrounding housing 812, while cam slot 832 is not connected to cam slot 832b. In other examples, cam 830/830b is a single piece at least partially surrounding housing 812 and cam slot 832/832b combine to define a single cam surface. In some such embodiments, lock ring 808/808b may be fully rotatable about the optical axis 804 while cam pin 810 navigates along the cam surface. The cam surface may include a first set of segments, each segment in the first set of segments being substantially parallel to the direction of the first length as described with regard to cam slot 832. The cam surface may include a second set of segments, each of the second set of segments disposed between segments in the first set of segments. Segments in the second set of segments may extend in a direction substantially parallel to a second direction, different from the first. In some embodiments, the cam 830 can include a detent at one or more junctions between a segment in the first set of segment and a segment in the second set of segments.

In some such examples, as lock ring 808 is rotated about the housing 812, cam pin 810 may move radially about the lens assembly 800 in a first direction. When moving in the first direction, when the cam pin 810 engages a segment in the first set of segments, it may force the cam 830 to translate in a first axial direction (e.g., proximally). However, if the cam pin 810 moves in the first direction while engaging a segment in the second set of segments, the cam 830 may move in a second axial direction (e.g., distally). Similarly, if the lock ring 808 is rotated in the opposite direction, cam pin 810 may move radially around the housing 812 in a second direction, opposite the first. In such operation, when the cam pin 810 engages a segment in the first set of segments during lock ring 808 rotation, the cam 830 may translate in the second direction (e.g., distally). Similarly, when the cam pin 810 engages a segment in the second set of segments during lock ring 808 rotation, the cam 830 may translate in the first direction (e.g., proximally). That is, in some such continuous-rotation examples, reversing the direction of rotation of the lock ring 808 may result in interchanging which of the first and second sets of segments of the cam surface correspond to proximal and distal translation of the cam 830. Accordingly, in some such embodiments, the lock ring 808 may be continuously rotated in a first direction about housing 812 to repeatedly increase and decrease the attachment force between the mounting mechanism 806 and the attachment assembly 130. Similarly, the lock ring 808 may be continuously rotated in a second direction about the housing 812 to repeatedly decrease and increase the attachment force.

Conversely, in some embodiments, counterpart ('b') components may be disjoint from their corresponding components. That is, add-on lens assembly 800 can include separate cams 830 and 830*b*, springs 840 and 840*b*, pushers 814 and 814*b*, or any other such components. In still further embodiments, add-on lens assembly 800 may exclude any such counterpart components, such as cam 830*b*. For example, the assembly 800 may include only a single cam 830 that does not surround housing 812. In general, in various embodiments, assembly 800 may include only single components such as cam 830, lock ring 808, pusher 814, spring 840, and the like only surrounding a portion of the housing 812 without fully encircling housing 812. It will be appreciated that various combinations of single components, continuous components, or multiple separate components may be used.

In various embodiments, the add-on lens assembly (e.g., 800) need not include all components illustrated. For example, as described, counterpart ('b') components of FIG. 9 may be excluded in some embodiments. Additionally or alternatively, embodiments may exclude other illustrated components, such as second spring (e.g., 842), or may combine the functionality of components. For instance, in some embodiments, the functionality of the pusher (e.g., 814) and the first spring (e.g., 840) may be combined into a single component. For example, the pusher (e.g., 814) may have spring-like properties and may itself be compressed by proximal motion of the cam (e.g., 830) and forced against the attachment assembly 130. Similarly, in some embodiments, functionality of the cam (e.g., 830) and the first spring (e.g., 840) may be combined into a single component. For instance, the cam may include a spring-like portion such that, when the cam translates proximally and presses against the pusher, the spring-like portion of the cam compresses. In still further embodiments, the functionalities of the cam (e.g., 830), the first spring (e.g., 842), and the pusher (e.g., 814) may be combined into a single component. For example, the cam may include a cam slot (e.g., 832) for integrating with the cam pin (e.g., 810), a spring-like portion configured to compress under pressure, and a pusher portion configured engage an attachment assembly of a camera. In some such embodiments, when the cam pin (e.g., 810) navigates through the cam slot (e.g., 832), the cam moves proximally so that the pusher portion presses against attachment assembly of a camera. The pushing against the attachment assembly can cause the spring-like portion to compress, maintaining a force between the pusher portion and the attachment assembly.

In still further embodiments, the functionality of the first spring (e.g., 840) can be omitted entirely. For instance, in some examples, and proximal motion of the cam (e.g., 830) may cause pusher (e.g., 814) to move proximally toward an attachment assembly of a camera, causing it to press against the attachment assembly and increase the force therebetween. In further embodiments, the cam can include a pusher portion extending toward the proximal end of the add-on lens assembly. In some such embodiments, when the cam moves proximally, the pusher portion engages the attachment assembly of a camera, increasing the force therebetween.

Figure 10:
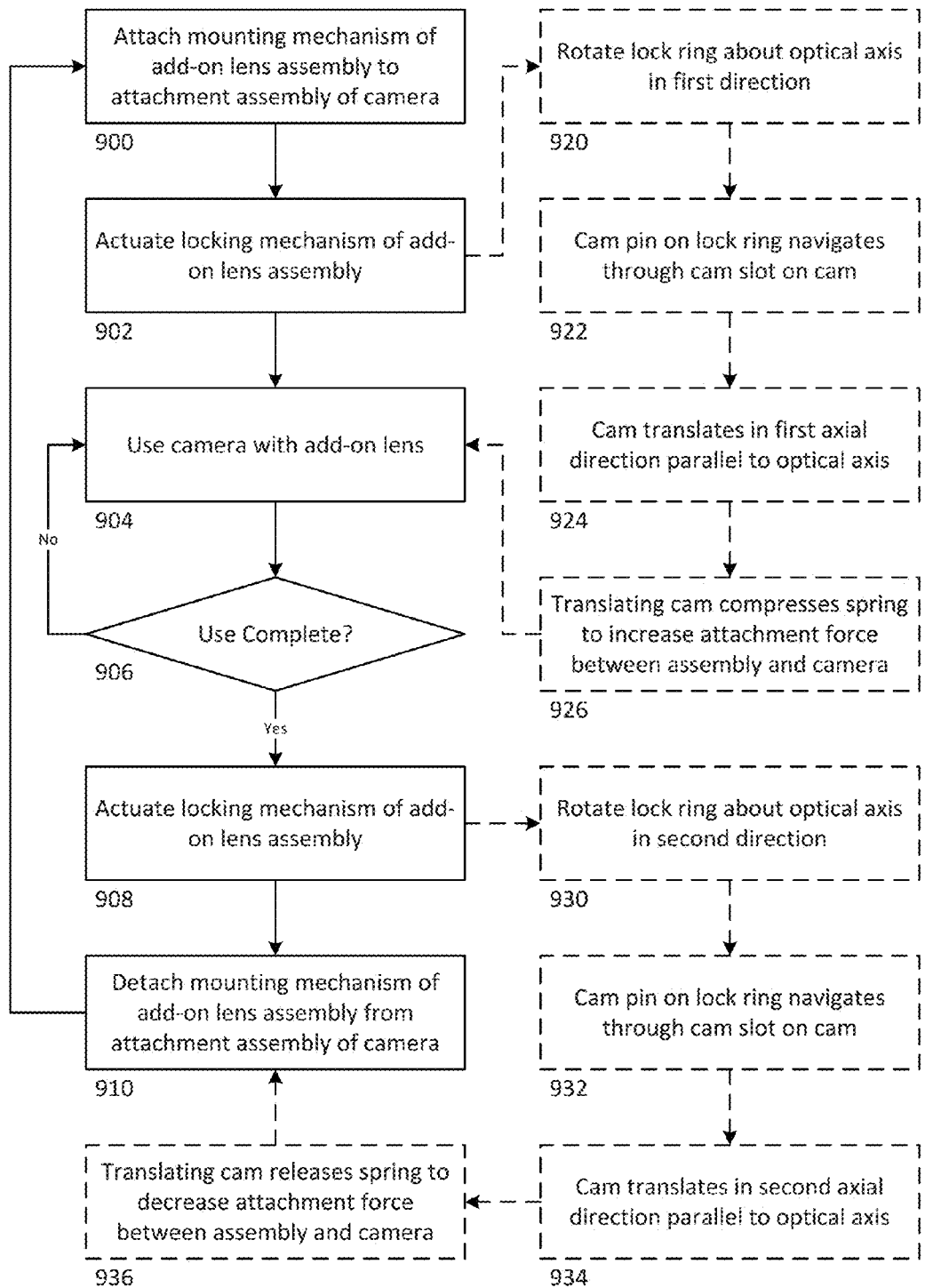
FIG. 10 is a process-flow diagram illustrating an exemplary method for operating a camera with an add-on lens assembly.

Embodiments of the add-on lens assembly (e.g., 400) can be utilized in a method of operating a camera. FIG. 10 is a process-flow diagram illustrating an exemplary method for operating a camera with an add-on lens assembly. In the event that a user wishes to utilize an add-on lens in an imaging operation, the user can attach a mounting mechanism of an add-on lens assembly housing the lens to an attachment assembly of the camera (900). Attaching the mounting mechanism to the attachment assembly can be performed in a variety of ways using a variety of mechanisms, such as a screw-on or bayonet attachment scheme. Once the add-on lens assembly has been attached to the camera, the user can actuate a locking mechanism of the add-on lens assembly (902). Actuating the locking mechanism can act to secure the add-on lens assembly to the camera, reducing the risk of the lens sagging and causing optical misalignment between the add-on lens and the camera.

Once the add-on lens assembly is secured to the camera by actuating the locking mechanism of the add-on lens assembly (902), the user can use the camera with the add-on lens (904) until the use is complete (906). Once the use of the add-on lens is complete, the user can again actuate the locking mechanism of the add-on lens assembly (908). Actuating the locking mechanism from the locked position can unsecure the add-on lens assembly from the camera. Thus, after actuating locking mechanism, the user can detach the mounting mechanism of the add-on lens assembly from the attachment assembly of the camera (910). Upon subsequent desired use of the add-on lens assembly, the user can repeat the process.

In some embodiments, actuating the locking mechanism of the add-on lens assembly (902) can comprise rotating a lock ring of the add-on lens assembly about an optical axis defined by the lens of the add-on lens assembly in a first direction (920). The rotation of the lock ring can cause a cam pin secured to the lock ring to navigate through a cam slot in a cam of the add-on lens assembly (922). Navigation of the cam pin through the cam slot can cause the cam to translate in a first axial direction parallel to the optical axis (924). Translation of the cam can compress a spring and increase the attachment force between the add-on lens assembly and the camera (926). This can secure the add-on lens assembly to the camera during use (904).

Once the use of the add-on lens assembly is complete (906), actuating the locking mechanism of the add-on lens assembly (908) can comprise rotating the lock ring about the optical axis in a second direction (930). In some examples, the second direction can be opposite the first. In other examples, the second direction can be the same as the first direction in a continuously rotatable embodiment. Rotating the lock ring in the second direction can cause the cam pin to navigate through the cam slot (932), causing the cam to translate in a second axial direction parallel to the optical axis (934). In some embodiments, the second axial direction is opposite the first axial direction. Translation of the cam in the second axial direction (934) can release compression on the spring to decrease the attachment force between the add-on lens assembly and the camera (936). Once the attachment force is decreased (936), the user may more easily detach the mounting mechanism of the add-on lens assembly from the attachment assembly of the camera (910).

It will be appreciated that, while some described examples include add-on lens assemblies having infrared lenses for use with thermal imaging camera, structures and methods herein described may be used in a variety of optical configurations. For instance, add-on lens assemblies such as those described may be used to attach an add-on visible light lens to a standard visible light camera. In general, such structures can be used to more securely attach an add-on lens to any appropriate optical system without departing from the scope of the invention. Various lens assemblies have been described. These and others are within the scope of the following claims.

The invention claimed is:

1. An add-on lens assembly for a camera comprising:
   a lens housing;
   a mounting mechanism coupled to the lens housing and configured to engage an attachment assembly of the camera;
   a lens mounted in the lens housing, the lens defining a central optical axis and a lens plane normal to the central optical axis;
   a cam positioned adjacent to a portion of the lens housing, the cam including a cam slot having a first length extending in a direction non-parallel to the lens plane and being adjustable between at least a first cam position and a second cam position;
   a pusher positioned adjacent to a portion of the attachment assembly of the camera, wherein the force between the pusher and the attachment assembly of the camera comprises a first force when the cam is in the first cam position and a second force when the cam is in the second cam position;
   a lock ring being rotatable between a first lock ring position and a second lock ring position; and
   a cam pin having a first end and a second end, the first end of the cam pin being fixed to the lock ring and the second end of the cam pin extending through the cam slot in the cam; whereby
   rotating the lock ring from the first lock ring position to the second lock ring position causes the cam pin to navigate through the first length of the cam slot, forcing the cam to transition from the first cam position to the second cam position and changing the force between the pusher and the attachment assembly of the camera from the first force to the second force.

2. The assembly of claim 1, wherein the first cam position and the second cam position are such that the cam transitioning from the first cam position to the second cam position comprises translating in a direction having a component parallel to the central optical axis.

3. The assembly of claim 2, wherein the first cam position is located distally relative to the second cam position, and wherein the second force is greater than the first force.

4. The assembly of claim 1, further comprising a first spring positioned between the cam and the pusher, wherein when the cam transitions from the first cam position to the second cam position, the cam compresses the first spring.

5. The assembly of claim 4, further comprising a second spring positioned adjacent to and distal from the cam, the second spring being positioned between the cam and a portion of the housing, wherein the second spring provides resistance to transitioning the cam from the second cam position to the first cam position.

6. The assembly of claim 5, wherein the cam slot has a first end and a second end, the first length of the cam slot extending between the first and second ends, and wherein each of the first and second ends of the cam slot comprises a detent for receiving the cam pin when the lock ring is in the first or the second lock ring positions, respectively.

7. The assembly of claim 4, wherein the first spring, the cam, and the pusher are separate components.

8. The assembly of claim 1, wherein the mounting mechanism comprises at least one tab configured to interface with a groove of the attachment assembly in a bayonet configuration.

9. The assembly of claim 1, wherein the lock ring has a substantially circular cross-section and surrounds a portion of the housing.

10. The assembly of claim 9, further comprising a second cam pin having a first end coupled to the lock ring and a second end, and wherein the cam comprises a second cam slot for receiving the second end of the second cam pin.

11. The assembly of claim 10, wherein the can has a substantially circular cross-section and surrounds a portion of the housing, the cam being positioned between the lock ring and the housing.

12. The assembly of claim 10, further comprising a radial groove disposed in the housing, the radial groove circumferentially surrounding the housing and positioned to receive the second ends of the first and second cam pins.

13. The assembly of claim 1, further comprising an indicator positioned on the lock ring for communicating the position of the lock ring to the user.

14. The assembly of claim 1, further comprising an axial pin having a first end and a second end, the first end secured to the housing; wherein
   the cam includes an axial slot extending in a substantially axial direction and receiving the second end of the axial pin, such that motion of the cam is restricted to translation in a substantially axial direction.

15. The assembly of claim 1, wherein the lens is an infrared lens and the add-on lens assembly is configured for attachment to a thermal imaging camera.

* * * * *